US012808478B1

(12) United States Patent
Shelton

(10) Patent No.: US 12,808,478 B1
(45) Date of Patent: Nov. 24, 2026

(54) MULTIPLE ENCASEMENT SYSTEM FOR PRESSURIZED CONDUIT BOUNDARY INTEGRITY ASSURANCE AND MAINTENANCE

(71) Applicant: Michael Shelton, Houston, TX (US)

(72) Inventor: Michael Shelton, Houston, TX (US)

( * ) Notice: Subject to any disclaimer, the term of this patent is extended or adjusted under 35 U.S.C. 154(b) by 511 days.

(21) Appl. No.: 18/224,516

(22) Filed: Jul. 20, 2023

(51) Int. Cl.
*F16L 55/172* (2006.01)
*F16L 55/18* (2006.01)

(52) U.S. Cl.
CPC .................................... *F16L 55/18* (2013.01)

(58) Field of Classification Search
CPC ..... F16L 55/18; F16L 55/168; F16L 55/1683; F16L 55/17; F16L 55/178; F16L 55/172; F16L 57/00; F16L 3/00; F16L 3/08; F16L 3/10; F16L 3/1008; F16L 3/12; F16L 3/1207; F16L 55/16; F16L 9/047; F16L 21/06; F16L 55/1705; F16L 2201/30; F16L 23/167; G01M 3/02; G01M 3/022; G01M 3/04
USPC ...................................................... 138/97, 99
See application file for complete search history.

(56) References Cited

U.S. PATENT DOCUMENTS 8,882,154 B1 * 11/2014 Howell .................. F16L 17/10 285/97
9,285,065 B2 3/2016 Williams
9,863,571 B2 1/2018 Critsinelis et al.
2018/0231145 A1 * 8/2018 Haight ...................... F16L 3/24
2018/0274710 A1 * 9/2018 Strother .............. F16L 55/1683
2019/0107233 A1 * 4/2019 Goulet .................. F16L 21/065
2019/0219213 A1 * 7/2019 Tuck ..................... F16L 21/065
2020/0109606 A1 * 4/2020 Arora .................... E21B 17/003
2021/0003241 A1 1/2021 Cajiga et al.
2022/0090724 A1 * 3/2022 Jeaurond ................... F17D 5/04
2022/0196199 A1 * 6/2022 Hill ........................ F16L 55/172
2022/0371261 A1 * 11/2022 Ehsani .................... F16L 11/24

FOREIGN PATENT DOCUMENTS

CN 104832746 A * 8/2015 ............ F16L 55/168
DE 102008059062 A1 * 5/2010 ............... B23C 3/00
EP 4098923 A1 * 12/2022 ............ F16L 55/172

* cited by examiner

*Primary Examiner* — Craig M Schneider
*Assistant Examiner* — Joshua D Leary
(74) *Attorney, Agent, or Firm* — Plager Schack LLP; Mark H. Plager; Naomi Mann

(57) ABSTRACT

Disclosed is a pipeline encasement system comprising multiple shells around a pipeline. Further, the system houses all pressurized shells in a series of sealed barriers that isolate the affected pipeline and the pressurized shell or shells from adverse environment effects resulting in a high integrity dual or multiple pressure containment system which is inert from environment impacts over time. Further, leak detection and real-time pressure testing of any and all system annuli is provided.

19 Claims, 14 Drawing Sheets

MULTIPLE ENCASEMENT SYSTEM FOR PRESSURIZED CONDUIT BOUNDARY INTEGRITY ASSURANCE AND MAINTENANCE

BACKGROUND

The present disclosure relates generally to pipeline systems, and more specifically to systems for repair, protection, and/or maintenance of high-pressure piping.

Damage of high-pressure pipelines may entail high-cost repair, service interruption of the pipeline, and/or de-inventorying. Further, pipeline codes may require costly pressure testing of any newly installed section. As such, an improved pipeline system is desirable.

SUMMARY

According to various embodiments, disclosed is a pipeline system providing an encasement assembly for pressurized conduit boundary integrity assurance and maintenance. In certain embodiments, the disclosed system may comprise installation of multiple encasement shells around the pipeline. In some embodiments, a high-pressure encasement shell may be fitted around a distressed/failing pipeline pressure boundary. In further embodiments, the high-pressure shell may be further encased in a non-pressurized barrier shell configured to isolate the high-pressure shell from aggravated exposure to adverse environmental conditions. This may extend the life of the high-pressure shells and, by default, the service life of the distressed/repaired pipeline pressure boundary.

In further embodiments, the disclosed pipeline system enables leak detection and in-situ, real-time pressure testing of any annulus of the high-pressure encasement shell. This may include the annulus of the distressed pipeline pressure barrier and the first high-pressure encasement shell. In further embodiments, leak detection and real-time pressure testing may also be applied for any annulus between subsequent high-pressure encasement shells beyond the first and primary high-pressure encasement shell. In yet further embodiments, the disclosed pipeline system enables low pressure, real-time, in-situ pressure testing of non-pressurized barrier shell annuli for seal integrity validation.

In yet further embodiments, the disclosed pipeline system provides additional safeguarding of the high-pressure encasement shells by enabling real-time placement and on-going replacement of protective fluids in each and any high-pressure encasement shell annuli. As such, should the pipeline high-pressure boundary fail, the existence of protective fluid in the annulus between the pipeline pressure boundary and the first high-pressure encasement shell may serve to protect the first high-pressure encasement shell from the adverse and released pipeline process fluids. This same protective fluid role may be played out with any subsequent, over time, failure of the next high-pressure sleeve from released high-pressure process fluid due to failure of the current high-pressure shell pressure containment. In further embodiments, the disclosed pipeline system provides corrosion protection to the encasement system and protected pipeline.

In certain embodiments, the disclosed pipeline system provides redundant pressure containment assembly that encircles and protects new or existing pressure conduits for improved longevity, increased environmental protection, and public safety. In further embodiments, the pipeline system provides an encasement assembly wherein the pressure containment integrity of any and all of the high-pressure containment encasement shells can be real-time, in-situ pressure tested to assure adequate and continued redundant pressure containment per encasement shell. In certain embodiments, the disclosed pipeline system may further comprise a non-pressurized, environment barrier system configured to allow differential thermal expansion management between the barrier system and the new or existing pressure conduit of interest, and isolate the associated high-pressure encasements shells from any and all adverse environment affects. In further embodiments, the multiple pressure encasement systems can be daisy-chained together over large spans of pipeline.

According to various embodiments, disclosed is an encasement assembly for a pipeline, the pipeline comprising at least one new or existing conduit, the encasement assembly comprising: an encasement shell configured to enclose around the pipeline; a barrier shell configured to enclose around the encasement shell; and an anchor flange sleeve assembly configured to couple an end of the encasement shell and/or barrier shell, wherein the anchor flange sleeve assembly comprises a main anchor flange, the main anchor flange including at least one port comprising an opening which extends radially inwards from an exterior surface of the main anchor flange. In further embodiments, the at least one port in the main anchor flange comprises a first radially extending external port and a first axially extending internal port, wherein the first radially extending external port provides an opening which extends radially inwards from an exterior surface of the anchor flange, wherein the first axially extending internal extends perpendicularly across a bottom end of the first radially extending external port and opens to an isolated annulus between an external surface of the encasement shell and an internal surface of the barrier shell. In further embodiments, the at least one port in the main anchor flange includes a second radially extending external port and a second axially extending internal port, wherein the second radially extending external port provides an opening which extends radially inwards from an exterior surface of the anchor flange, wherein the second axially extending internal extends perpendicularly across a bottom end of the second radially extending external port and opens to an annulus between an external surface of the pipeline and an internal surface of the encasement shell. In yet further embodiments, the encasement assembly includes a galvanic cathodic protection element within the encasement shell.

In certain embodiments, the anchor flange sleeve assembly may further comprise an anchor sleeve coupled to the main anchor flange, wherein the anchor sleeve is configured to affix directly to the pipeline, and wherein the encasement shell is configured to affix to the main anchor flange. In some embodiments, the encasement shell is configured to establish a high-pressure seal around the pipeline. In some embodiments, the encasement assembly may further comprise an environmental barrier flange sealably affixed to an end of the barrier shell to form an environmental barrier assembly with the barrier shell. In some embodiments, the encasement assembly may further comprise a barrier expansion management assembly configured to allow for differential thermal expansion between the encasement shell and the barrier shell, the barrier expansion assembly comprising a thermal expansion joint affixed to an expansion anchor flange, wherein the barrier management expansion assembly is configured to affix to an end of the environmental barrier assembly. In certain embodiments, the encasement assembly includes a first end and a second end, wherein: the flange sleeve assembly includes a first flange sleeve assembly coupled to the encasement shell and/or barrier shell at the first end of the encasement assembly, and a second flange sleeve assembly coupled to the encasement shell and/or barrier shell at the second end of the encasement assembly; the environmental barrier flange includes a first environmental barrier flange affixed to a first end of the barrier shell, and a second environmental barrier flange affixed to a second end of the barrier shell, wherein the barrier expansion management assembly is coupled to the first environmental barrier flange at the first end of the encasement assembly, wherein a barrier anchor flange is coupled to the second environmental barrier flange at the second end of the encasement assembly, wherein the main anchor flange of the first flange sleeve assembly is affixed to the thermal expansion joint of the barrier expansion management assembly at the first end of the encasement assembly, and wherein the main anchor flange of the second flange sleeve assembly is affixed to the barrier anchor flange at the second end of the encasement assembly. In some embodiments, the encasement shell, barrier shell, main anchor flange, anchor sleeve, environmental barrier flange, thermal expansion joint, and expansion anchor flange are each formed from at least two arcuate components that assemble to form a circular enclosure.

In certain embodiments, the disclosed subject matter provides a system wherein continued pressure containment integrity is assured and protected from corrosion from a failed pressurized conduit product either directly from the pressurized conduit or any preceding high-pressure containment shells. In certain embodiments, such corrosion protection of the system may comprise using a corrosion allowance per high-pressure encasement shell via thicker shell walls either constant or variable for each shell emanating from the pressurized conduit. In some embodiments, corrosion protection of the system may comprise using a hot-dipped galvanized coating on the internal surfaces of each subsequent high-pressure encasement shell to protect the high-pressure encasement shell internal surface from corrosion. In some further embodiments, corrosion protection may comprise using a galvanic cathodic protection system consisting of a sacrificial anode system installed and electrically connected to each individual subsequent high-pressure encasement shell internal surface. In further embodiments, corrosion protection may comprise using real-time injectable liquid inhibitors to completely fill the annulus space between the pressurized conduit outside surface and the subsequent high-pressure encasement shell internal surface and all subsequent annuli formed by any series of high-pressured encasement shells emanating from the pressurized conduit, wherein any liquid inhibitor volume may be replaced, renewed and tested in-situ at any time over the life of this invention. In yet further embodiments, corrosion protection of the system may comprise using appropriate material for corrosion control, wherein material selection can be constant for each subsequent high-pressure encasement shell in a series emanating away from the pressurized conduit or may vary by each subsequent encasement shell in a series.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
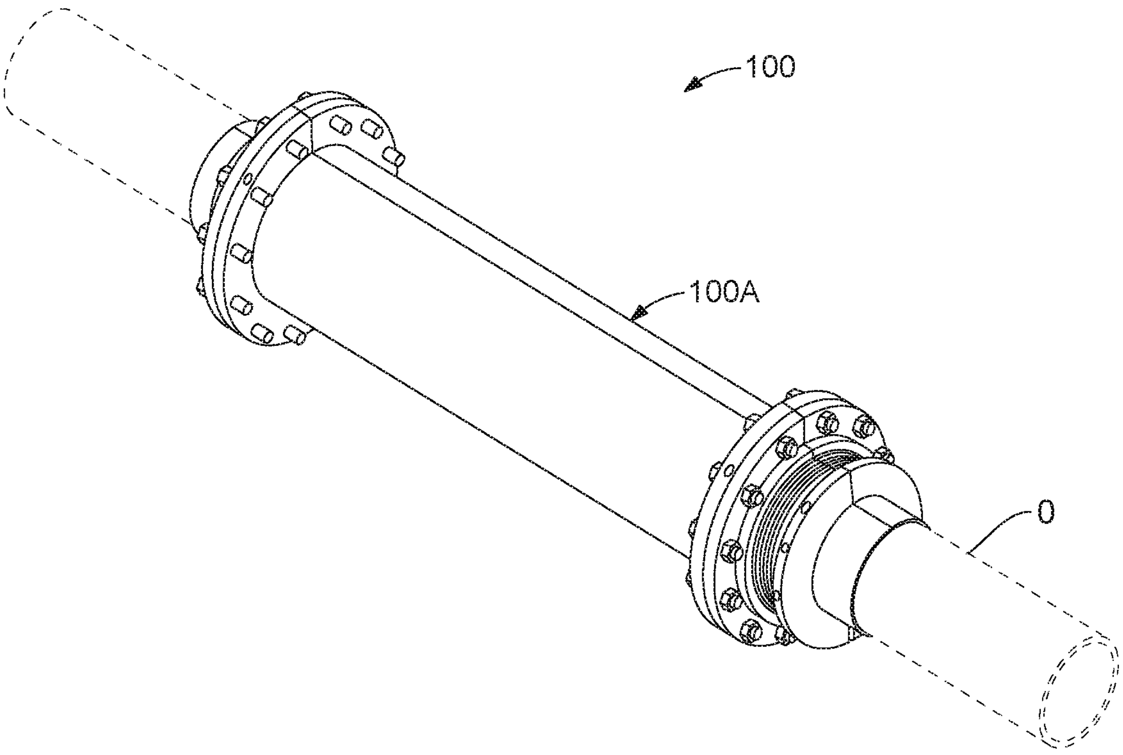
FIG. 1 is a perspective view of a pipeline system, in accordance with various embodiments.
Figure 2:
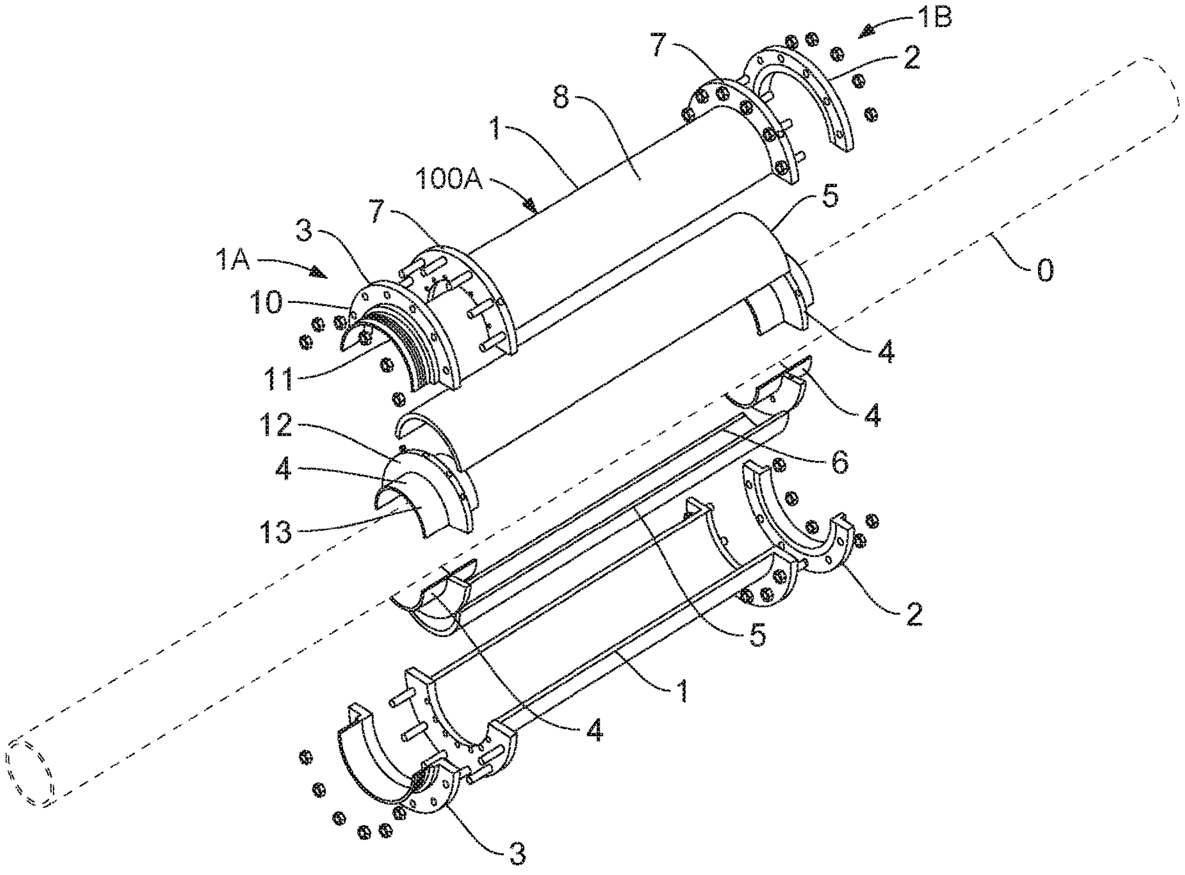
FIG. 2 is an exploded view of the pipeline system.

Pipelines, particularly highly pressurized lines, are susceptible to damage and may need frequent repair and/or maintenance. One approach to repairing such damaged pipelines may entail system shutdown, de-inventorying, and/or cutting out and replacing the damaged section to return the pipeline to service. Another repair approach may comprise welding two pipeline components, through which the damaged high-pressure pipeline is penetrated under pressure and service, inserting flow blockage devices through the newly welded pipeline components and the associated damaged pipeline penetrations, and with the flow blockage devices activated, cutting out and replacing the damaged section, removing the flow blockage devices, and finally, returning the pipeline to service with the replaced pipeline section now in service. This approach may require very costly equipment for installation the flow blockage devices, and optionally for a bypass around the damaged section during the repair process for continued pipeline service The disclosed subject matter introduces a pipeline system 100 for protection, repair, and/or monitoring of a pipeline 0. In certain embodiments, pipeline system 100 provides an encasement assembly 100A for repair of in-service pipelines or piping which may be experiencing pressure boundary degradation or have experienced pressure boundary failure requiring pressure boundary repair. In some embodiments, encasement assembly 100A may also provide protection from external environmental damage to the pipeline. In certain embodiments, encasement assembly 100A may be configured to inhibit corrosion of pipeline 0 and encasement assembly 100A due to factors such as internal leaks within the pipeline and/or environmental causes. In further embodiments, pipeline system 100 is configured to support real-time pressure testing and/or constant, real-time leak detection from any and all system annuli. In yet further embodiments, pipeline system 100 allows for repair of pipeline 0 without invasion to the pressure barrier and/or exposure of personnel to high-pressure flow (gas or liquid) from a failed flow blockage device. This results in a less costly pipeline repair, protection, and/or monitoring system that is safer to install and assures greater pipeline longevity.

According to various embodiments disclosed, an encasement assembly configured to provide multiple protective shells for a pipeline 0 to ensure and protect boundary integrity of the pipeline. As depicted in FIGS. 1-14, encasement assembly 100A may generally comprise a high-pressure encasement shell 5, and an anchor flange sleeve assembly 4 configured to attach high-pressure encasement shell 5 around pipeline 0. In further embodiments, encasement assembly 100A may also comprise a non-pressurized environmental barrier assembly 1, and a non-pressurized barrier thermal expansion management assembly 3 as will be described. Pipeline 0 may comprise at least one new or existing conduit, which may be pressurized in operation. In certain embodiments, non-pressurized barrier thermal expansion management assembly 3 ("expansion management assembly 3") is configured to couple to non-pressurized environmental barrier assembly 1 (barrier assembly 1") in an air-tight manner. Thermal expansion management assembly 3 and barrier assembly 1 may together form a non-pressurized, sealed environment enclosing high-pressure encasement shell 5. Together with high-pressure encasement shell 5, barrier assembly 1 and expansion management assembly 3 provide isolation and/or redundant pressure boundaries for pipeline 0. This protects the pipeline from adverse external and/or local environmental aggression, particularly when the pipeline is in a high-pressure state.

Figure 3:
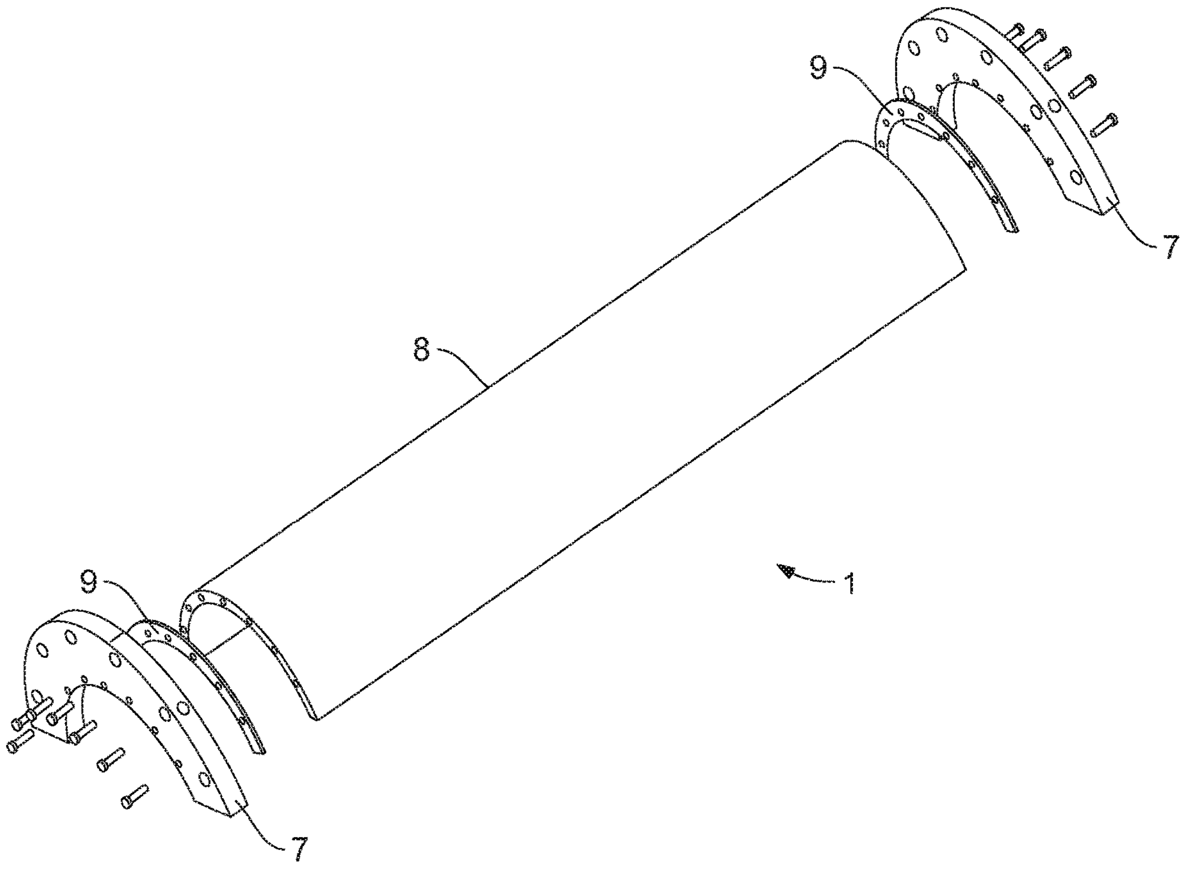
FIG. 3 is an exploded view of a protective barrier assembly of the pipeline system.

In embodiments as best depicted in FIG. 3, barrier assembly 1 may comprise a non-pressurized barrier shell 8. Barrier shell 8 may be formed from at least two arcuate components that together form a completed circular enclosure. In one embodiment, multiple arcuate components of barrier shell 8 may comprise a pair of cylindrical/circular halves. In further embodiments, barrier assembly 1 may also comprise a non-pressurized, environmental barrier flange 7, which may be formed from at least two arcuate components that together form a completed circular enclosure. In one embodiment, multiple arcuate components of environmental barrier flange 7 may comprise a pair of cylindrical/circular halves. Barrier shell 8 may be sealably affixed to environmental barrier flange 7. In some embodiments, an environmental barrier flange gasket 9 which may comprise a pair of circular halves, may provide an environmental seal between the barrier shell 8 and the environmental barrier flange 7, whereby the assembly may be secured via bolts engaged through corresponding holes within the assembly components as shown in the figure, or other attachment mechanism as is known in the art. In embodiments, non-pressurized barrier shell 8 may be made of a corrosion/erosion resistant material, such as stainless steel, copper, and the like, but is not limited to this option.

Figure 5:
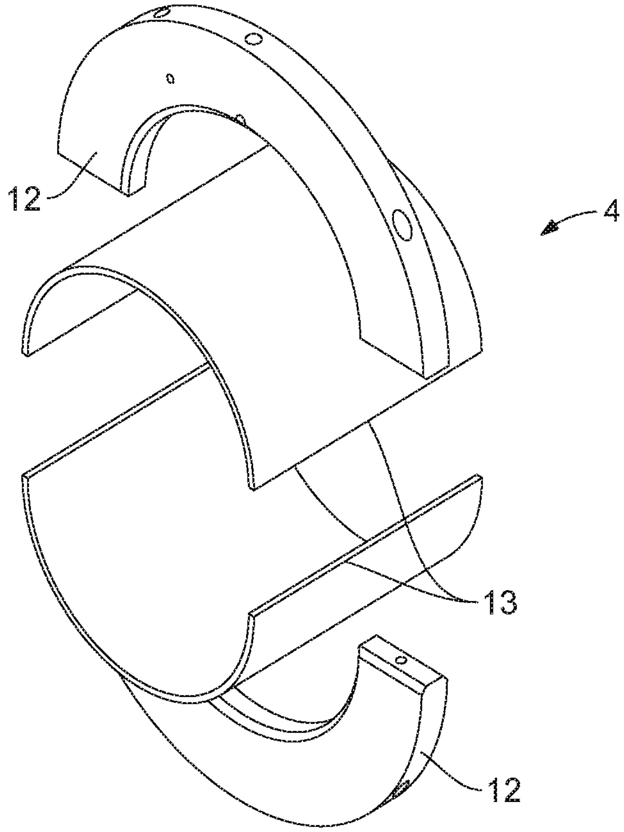
FIG. 5 is an exploded view of an anchor assembly of the pipeline system.

In embodiments as best depicted in FIG. 5, anchor flange sleeve assembly 4 may comprise a sleeve 13 ("anchor sleeve 13") and a main anchor flange 12, which may each be formed from at least two arcuate components that together form a completed circular/cylindrical assembly. In one embodiment, the arcuate components may comprise a pair of cylindrical/circular halves. In some embodiments, anchor flange sleeve assembly 4 is configured to attach high-pressure encasement shell 5 around pipeline 0 to establish a tight fitting or high-pressure seal between pipeline 0 and high-pressure encasement shell 5. The pair of sleeve halves of anchor sleeve 13 may first placed around pressurized pipeline 0 and may then be sealably affixed directly to pressurized pipeline 0, e.g., via adhesive or other bonding mechanism). The pair of flange circular halves of main anchor flange 12 may then be sealably affixed, e.g., adhesive or other bonding mechanism, to anchor sleeve 13 to form anchor flange sleeve assembly 4 configured to sealably attach high-pressure encasement shell 5. High-pressure encasement shell 5 may be formed from at least two arcuate components that together form a completed circular/cylindrical assembly. In one embodiment, the arcuate components of high-pressure encasement shell 5 may comprise a pair of cylindrical/circular halves. The encasement shell halves of high-pressure encasement shell 5 may each be attached to main anchor flange 12 via adhesive or other bonding mechanism and around pipeline 0, whereby the longitudinal seam between the encasement shell halves may be securely closed via adhesive or other bonding mechanism. The sealed high-pressure encasement shell 5 and main anchor flange 12 provide a high-pressure, high integrity containment volume formed by the annulus volume between the pressurized conduit 0 and the high-pressure encasement shell 5. As such, high-pressure encasement shell 5 provides a pressure containment redundancy and pressure integrity assurance to pipeline 0.

Figure 4:
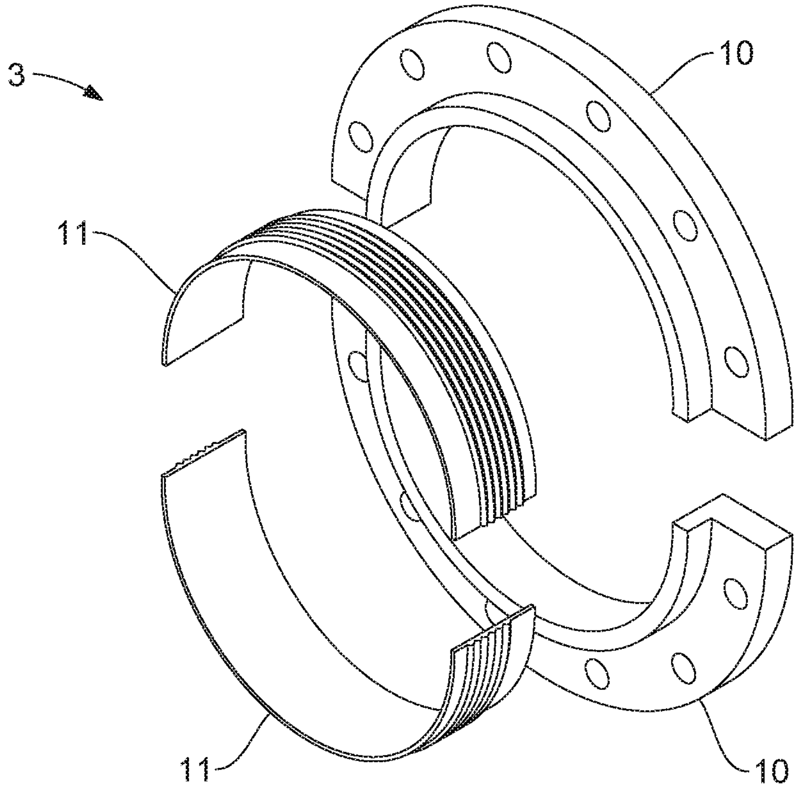
FIG. 4 is an exploded view of a protective barrier expansion joint assembly of the pipeline system.

According to various embodiments, barrier expansion management assembly 3 is configured to allow for differential thermal expansion between high-pressure encasement shell 5 and barrier shell 8 at different temperatures, which may be made of different materials. In some embodiments, environmental barrier expansion assembly 3 may be coupled to only one end or a first end 1A of environmental barrier assembly 1, while a barrier anchor flange 2 may be affixed directly and sealably to the main anchor flange 12 on a second end 1B of environmental barrier assembly 1 opposite the first end. As best depicted in FIG. 4, barrier expansion management assembly 3 may comprise a thermal expansion joint 11 and an expansion anchor flange 10, each of which may be formed from at least two arcuate components that together form a completed circular enclosure. In one embodiment, the arcuate components may comprise a pair of cylindrical/circular halves. Thermal expansion joint 11 may be sealably affixed, e.g., via adhesive or other bonding mechanism, to expansion anchor flange 10. Expansion anchor flange 10 of barrier 3 may in turn may be sealably affixed via bolts or similar attachment mechanism, to environmental barrier flange 7 of environmental barrier assembly 1 which provides thermal expansion relief. Once non-pressurized environmental barrier assembly 1 and environmental barrier expansion management assembly 3 have been sealably coupled, they may be joined to the main anchor flange 12 of anchor flange sleeve assembly 4.

In some embodiments, main anchor flange 12 may be directly and sealably affixed, e.g., via adhesive, to thermal expansion joint 11 at first end 1A of non-pressurized environmental barrier assembly 1 expansion management assembly 3. Another main anchor flange 12 may be directly and sealably affixed to barrier anchor flange 2 at second end 2B of environmental barrier assembly 1, the barrier anchor flange 2 being connected to non-pressurized environmental barrier flange 7 of environmental barrier assembly 1. This forms a full isolation and protective chamber between the external surface of the high-pressure encasement shell 5 and the internal surface of barrier shell 8.

Low-Pressure Testing of Environmental Barrier Assembly

Figure 6B:
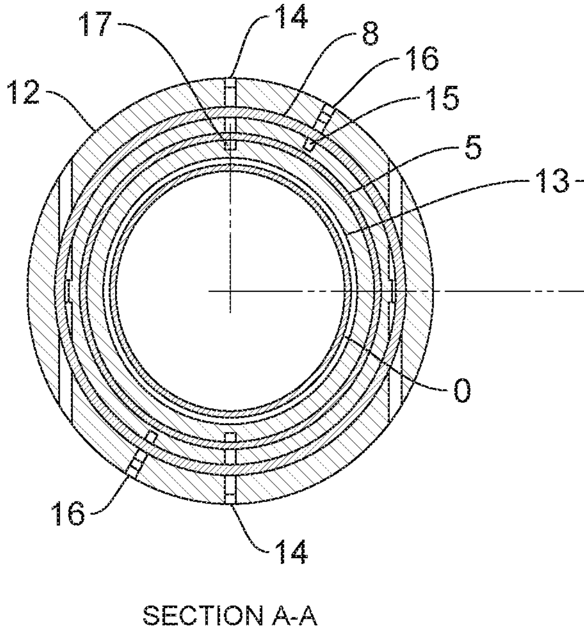
FIG. 6B is a section view taken along line A-A in FIG. 6A.
Figure 6A:
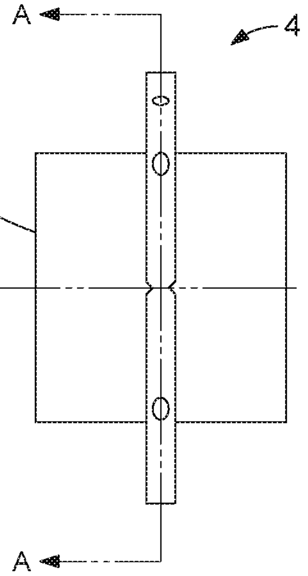
FIG. 6A is a side plan view of an anchor flange of the pipeline system.
Figure 7B:
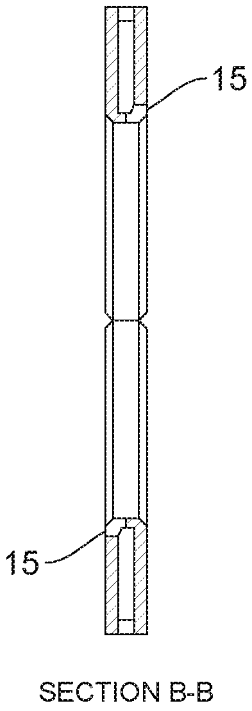
FIG. 7B is a section view taken along line B-B in FIG. 7A.
Figure 7A:
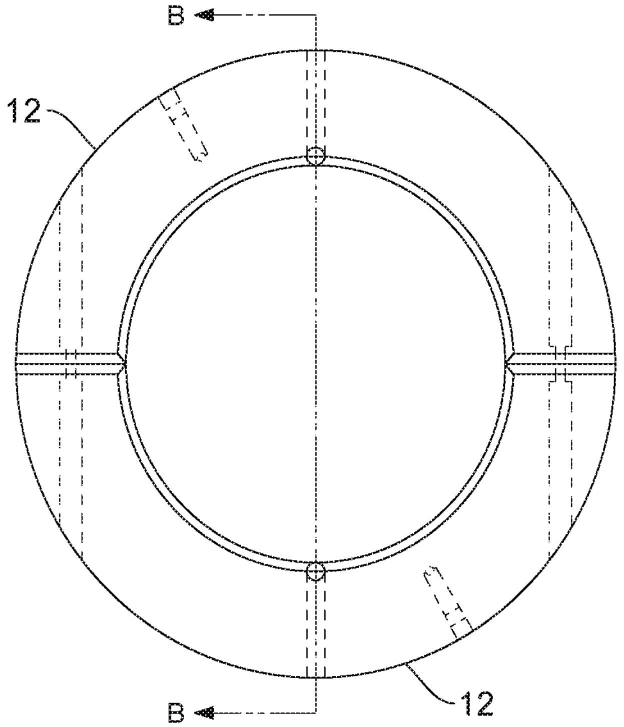
FIG. 7A is a front plan view of the anchor flange.
Figure 8:
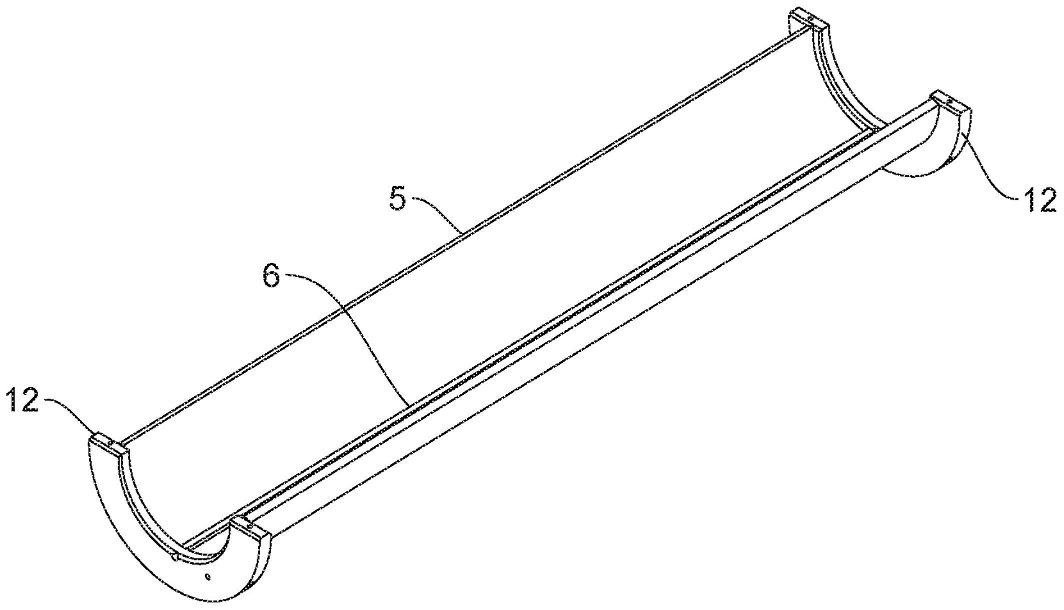
FIG. 8 shows a zinc anode ribbon installed as a corrosion preventor on a high-pressure encasement shell of the pipeline system.
Figure 9:
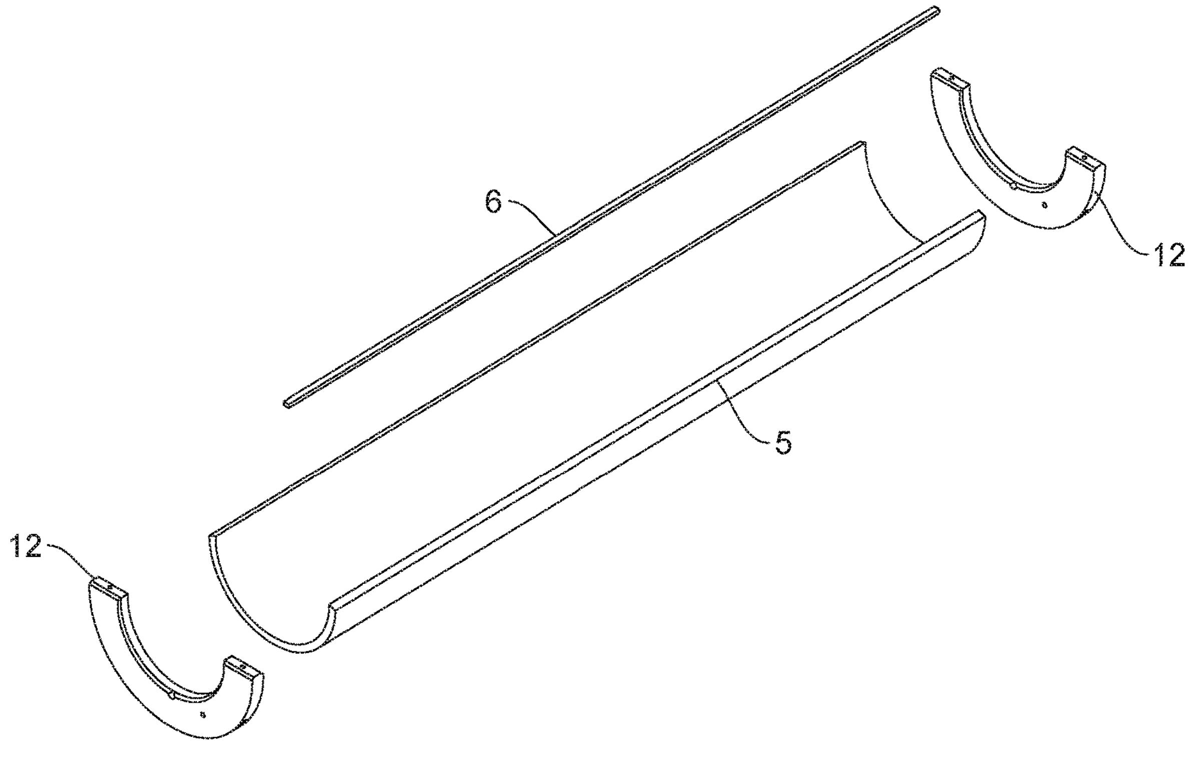
FIG. 9 is an exploded view of the high-pressure encasement shell with anode ribbon shown in FIG. 8.
Figure 10:
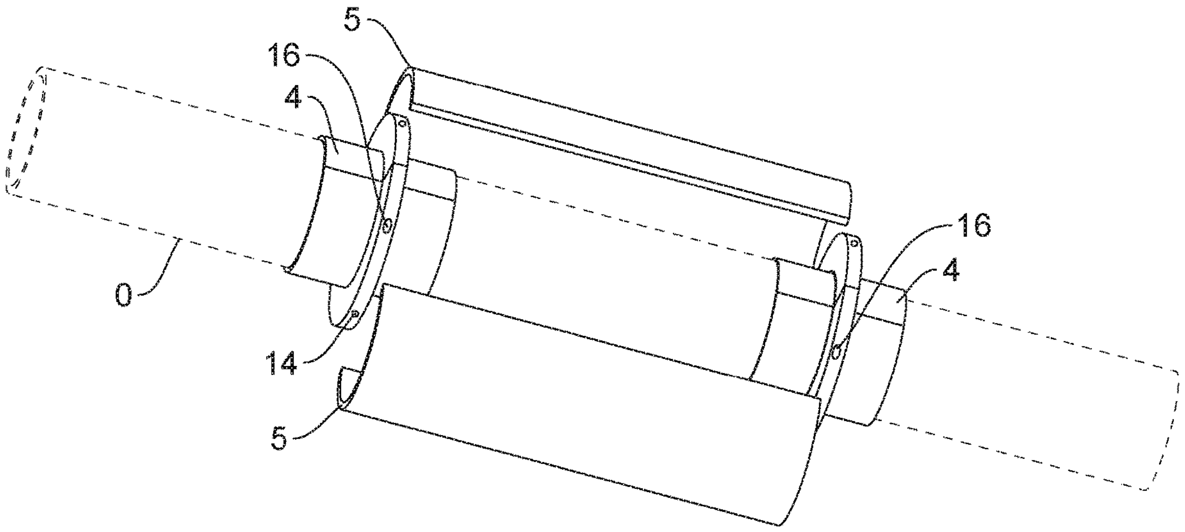
FIG. 10 is a partial exploded perspective view of the pipeline system.

In embodiments, main anchor flange 12 may be configured to enable real-time and in-situ, low pressure testing of non-pressurized environmental barrier assembly 1 encasement assembly 100A. To this end, and as best depicted in FIGS. 6 and 7, each half of main anchor flange 12 may comprise a first radially extending external port 16 (first external port 16) and a first axially extending internal port 15 (first internal port 15). In embodiments, first external port provides an opening which extends radially inwards from an exterior surface of the anchor flange. First internal port 15 may extend perpendicularly across a bottom end of first external port 16 and opens to the isolated annulus between the external surface of high-pressure encasement shell 5 and the internal surface of the barrier shell 8. As such first external port 16 is configured to provide external access to first internal port 15, for low pressure testing and/or leak detection within that isolated annulus.

High-Pressure Testing of Encasement Shell

In further embodiments, main anchor flange 12 may be configured to enable real time, high-pressure testing of encasement shell 5. To this end, and as best depicted in FIGS. 6, 8, 11 and 12, each half of main anchor flange 12 may comprise a second radially extending external port 14 (second external port 14) and a second axially extending internal port 17 (second internal port 17). In embodiments, second external port 14 provides an opening which extends radially inwards from an exterior surface of the anchor flange. Second internal port 17 may extend perpendicularly across a bottom end of second external port 14 and communicates directly to the high-pressure annulus between the external surface of pipeline 0 and the internal surface of the high-pressure encasement shell 5. As such, second external port 14 provides external pressure source access to second axially extending internal port 17. This allows external pressure to be introduced specifically for pressure testing and integrity assurance, thus enabling real-time, high-pressure testing of encasement shell 5. Integrity assurance of the redundant pressure maintenance offered by the high-pressure encasement shell 5 assures safe, continued operation of pipeline 0 and assures pressure containment integrity of encasement assembly 100A at any time during operation.

In further embodiments, monitoring second external port 14, e.g., via external pressuring monitoring equipment or other monitoring system provides a methodology for real-time leak detection. As second internal port 17 communicates directly with the high-pressure annulus between the external surface of pipeline 0 and the internal surface of the high-pressure encasement shell 5, any change in this annulus pressure from loss of pressure containment from pipeline 0 will cause a rise in pressure in the annulus between the external surface of pipeline 0 and the inner surface of high-pressure encasement shell 5. This rise in pressure will transmit to second external port 14 which may be actively monitored and/or connected to external pressure monitoring equipment for real-time leak detection capabilities.

Corrosion Protection of High-Pressure Encasement Shell

In certain embodiments, encasement assembly 100A may be configured to protect piping 0 from internal corrosion and/or damage that may compromise the pressurized pipeline 0 resulting from the release of corrosive process product into high-pressure encasement shell 5. To this end, a cathodic protection zinc ribbon 6 may be electrically attached to the internal surfaces between the circular halves forming high-pressure encasement shell 5 (See FIGS. 8 and 9). In some embodiments, high-pressure encasement shell 5 may be formed from and/or coated with corrosion resistant material(s) and/or may be hot-dipped galvanized. In some further embodiments, the wall thickness of encasement shell 5 may be increased to provide reasonable protection from corrosion due to leaks in pipeline 0. This may entail providing corrosion allowance for the high-pressure encasement shells based on known pipeline corrosion rates. It shall be appreciated that a variable corrosion allowance thickness design may promote variable corrosion control using variable corrosion allowances.

In one embodiment, hot-dipped galvanizing of both sides of high-pressure encasement shell 5 may be used to provide a galvanic coupling of a zinc component, such as zinc ribbon 6, within the high pressure encasement shell 5. It shall be appreciated that a galvanic sacrificial ribbon of other appropriate galvanic cathodic protection element may be used in alternate embodiments. As such, high-pressure encasement shell 5 may be protected from internal corrosion damage due to leaks in pipeline 0 and/or external corrosion damage, to ensure pressure integrity of pipeline 0.

Figure 11:
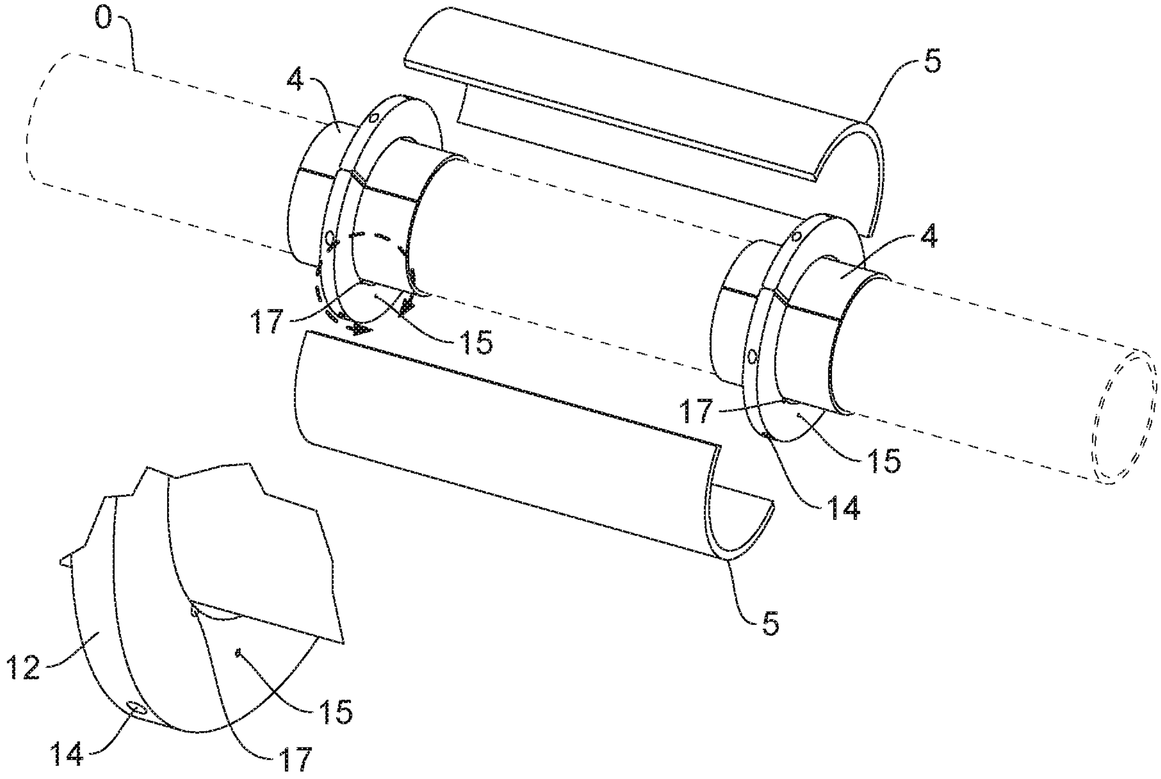
FIG. 11 is another partial exploded perspective view of the pipeline system, including a close-up perspective view of a lower half of the anchor flange on a first side of the system.
Figure 12:
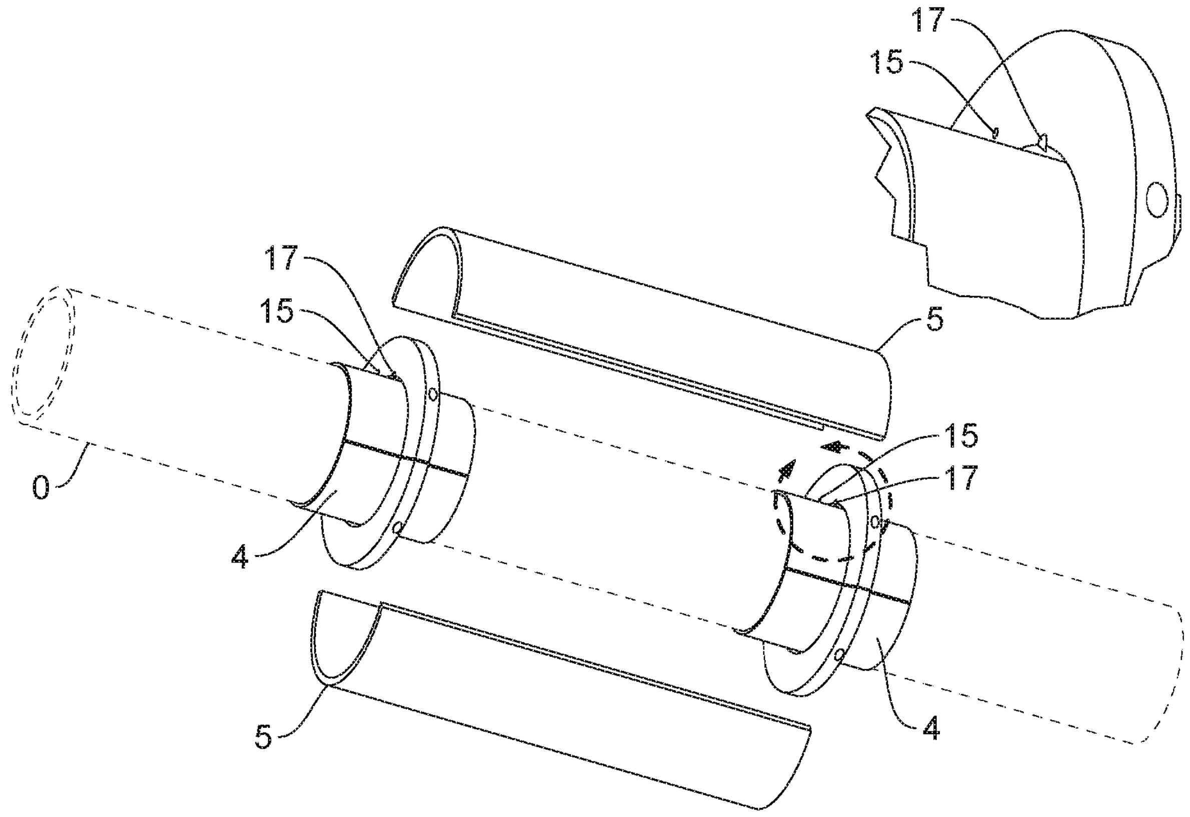
FIG. 12 is a partial exploded perspective view similar to FIG. 11, with a close-up perspective view of an upper half of the anchor flange on a second side of the system.
Figure 13:
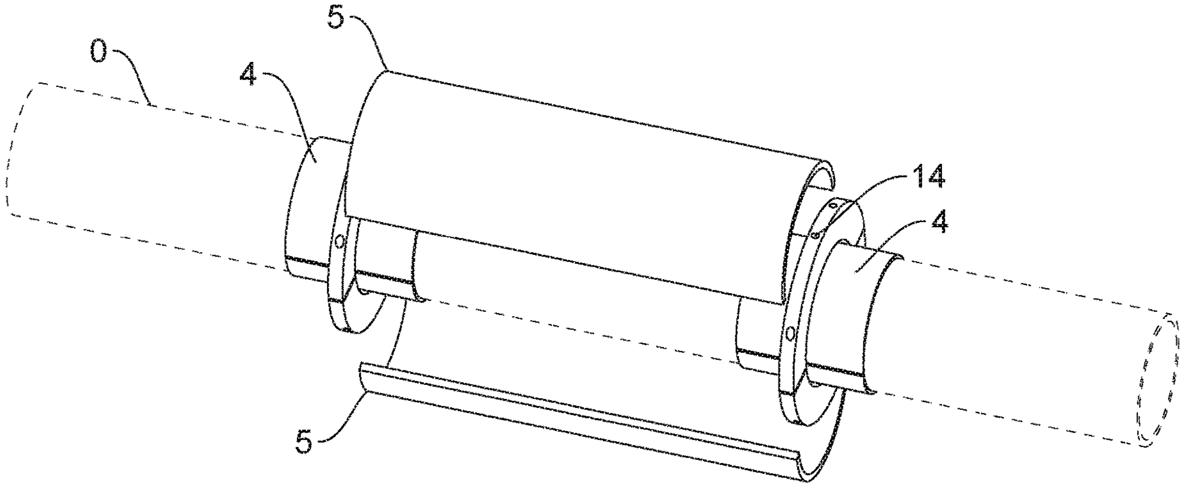
FIG. 13 is another partial exploded perspective view of the pipeline system.

In some further embodiments and with specific reference to FIGS. 10-13, inhibiting corrosion may be achieved by injecting a corrosion inhibitor into the annulus between pipeline 0 and high-pressure encasement shell 5 for corrosion control in this annulus. In certain embodiments, the inhibitor may be injected into second external port 14 (see FIG. 10) on a lower half of main anchor flange 12 through the annulus to second external port 14 on an upper half of main anchor flange 12, on opposite ends of the annulus. This may eliminate air pockets within the annulus, assuring the acceptance of the inhibitor into the annulus and providing a complete annulus coverage. FIG. 11 shows internal access port 17 into the annulus from second external injection port 14. Corrosion inhibitor may flow from internal injection port 17 on the lower half of main anchor flange 12, filling the annulus until the level reaches internal injection port 17 (see FIG. 12) on the other end of the annulus. Continued injection of corrosion inhibitor then brings the inhibitor to the second external injection port 14 at the upper half of main anchor flange 12 (see FIG. 13). At this point, an external leak may be detected at external port 14 on the upper half of main anchor flange 12. In some embodiments, a leak detection component can be connected to external port 14 of the upper half of main anchor flange 12.

The non-pressurized environment barrier assembly 1 coupled with the environmental barrier thermal expansion management system 3 isolates the external surface of high-pressure encasement shell 5 from all adverse environmental effects including stray current, corrosive soil, and cyclic overburden loads. Coupled with corrosion protection of the internal surface of the high-pressure encasement shell 5, protected redundant pressure containment for the associated section of pipeline 0 is achieved.

Figure 14:
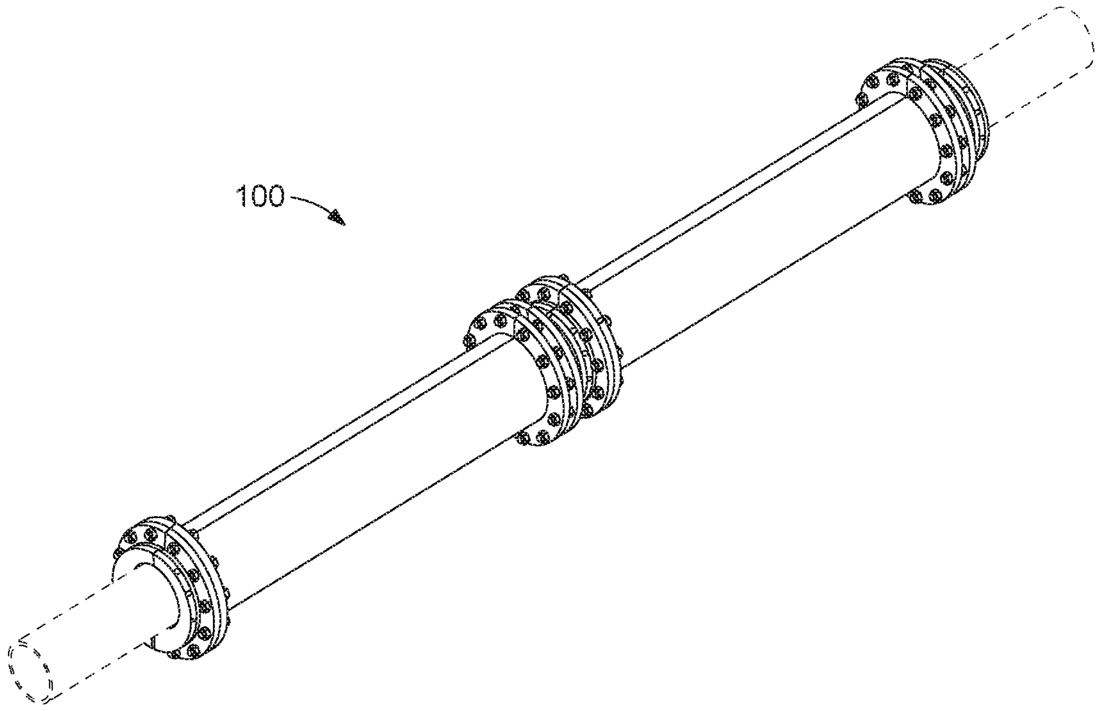
FIG. 14 is a perspective view showing chain installation of the pipeline system.

With reference to FIG. 14, isolated, daisy-chained segments may be provided where pipeline 0 is needed to span a long distance. This breaks up the long span into manageable sections for more accurate locating potential leaks in pipeline 0. In certain embodiments, segmentation may be accomplished by the orientation of the anchor flange clamshells at the beginning and end of each segment as is shown in FIGS. 6, and 10-13. Interior first and second ports 15 and 17 on the upper half of main anchor flange 12 are oriented in the same direction at each end of the segment. Further, first and second ports 15 and 17 on the lower half of main anchor flange 12 are oriented in the same direction and opposite to the associated main anchor flange 12 at each end. This anchor flange orientation provides individual isolated pressure segments for any number of individual segments of any consistent or varying length along the full span of the area of interest on pipeline 0. Each segment may be independent and isolated supporting varying corrosion protection methods, materials of construction, and pressure testing per segment.

In use, encasement assembly 100A may be placed on pipeline 0 to provide a redundant, corrosion-protected pressure containment system for long-term pressure containment assurance in either new, existing, and/or damaged pressurized conduit 0. The disclosed system thus provides real-time, in-situ pressure pipeline 0 for protection of both continued operation and also the protection of sensitive environmental areas. The disclosed system further provides added safety assurance when used in areas in proximity to human activity.

It shall be appreciated that the disclosed pipeline system 100 can have multiple configurations in different embodiments. For example, while the components of the disclosed system described as formed from at least two arcuate components and/or circular/cylindrical halves, it shall be appreciated that these components are not necessarily identical and/or of the same arclength. In certain embodiments, the high-pressure encasement shell may comprise more than one shell; that is, a first high-pressure shell may be disposed around the outer surface of the pipeline, and any subsequent shells may be concentrically disposed around the outer surface of the previous shell, providing redundant high-pressure containment per shell.

It shall be appreciated that the components of pipeline system 100 described herein may comprise any alternative known materials in the field and be of any size and/or dimensions. It shall be appreciated that the components of invention described herein may be manufactured and assembled using any known techniques in the field.

As used herein, the articles “a” and “an” are intended to include one or more items and may be used interchangeably with “one or more.” Where only one item is intended, the term “one” or similar language is used. Also, as used herein, the terms “has”, “have”, “having”, “with” or the like are intended to be open-ended terms. Further, the phrase “based on” is intended to mean “based, at least in part, on” unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as ‘approximate,’ ‘approximately,’ ‘about,’ etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An encasement assembly for a pipeline, the pipeline comprising at least one new or existing conduit, the encasement assembly comprising:

an encasement shell configured to enclose around the pipeline and provide a redundant pressure containment boundary surrounding the pipeline;

a barrier shell configured to enclose around the encasement shell and provide environmental protection for the encasement shell, wherein the redundant pressure containment boundary and the environmental protection boundary define separate protective boundaries between the pipeline and external environment; and an anchor flange sleeve assembly configured to couple an end of the encasement shell and/or barrier shell, wherein the anchor flange sleeve assembly comprises a main anchor flange, the main anchor flange including:

a first radially extending external port providing an opening which extends radially inwardly from an exterior surface of the main anchor flange and a first axially extending internal port extending from the first radially extending external port and opening to an annulus between an external surface of the encasement shell and an internal surface of the barrier shell; and a second radially extending external port providing an opening which extends radially inwardly from the exterior surface of the main anchor flange and a second axially extending internal port extending from the second radially extending external port and opening to an annulus between an external surface of the pipeline and an internal surface of the encasement shell;

wherein the first radially extending external port and the first axially extending internal port are configured to permit pressure testing and/or leak detection of the annulus between the encasement shell and the barrier shell; and wherein the second radially extending external port and the second axially extending internal port are configured to permit pressure testing and/or leak detection of the annulus between the pipeline and the encasement shell and introduction of a protective fluid into the annulus between the pipeline and the encasement shell, wherein the protective fluid comprises a corrosion inhibitor.

2. The encasement assembly of claim 1, the anchor flange sleeve assembly further comprising an anchor sleeve coupled to the main anchor flange, wherein the anchor sleeve is configured to affix directly to the pipeline, and wherein the encasement shell is configured to affix to the main anchor flange.

3. The encasement assembly of claim 1, wherein the encasement shell is configured to establish a seal around the pipeline.

4. The encasement assembly of claim 1, further comprising:

an environmental barrier flange sealably affixed to an end of the barrier shell to form an environmental barrier assembly with the barrier shell.

5. The encasement assembly of claim 4, further comprising a barrier expansion management assembly configured to allow for differential thermal expansion between the encasement shell and the barrier shell, the barrier expansion assembly comprising a thermal expansion joint affixed to an expansion anchor flange, wherein the barrier expansion management assembly is configured to affix to an end of the environmental barrier assembly.

6. The encasement assembly of claim 5, the encasement assembly including a first end and a second end, wherein:

the flange sleeve assembly includes a first flange sleeve assembly coupled to the encasement shell and/or barrier shell at the first end of the encasement assembly, and a second flange sleeve assembly coupled to the encasement shell and/or barrier shell at the second end of the encasement assembly;

the environmental barrier flange includes a first environmental barrier flange affixed to a first end of the barrier shell, and a second environmental barrier flange affixed to a second end of the barrier shell, wherein the barrier expansion management assembly is coupled to the first environmental barrier flange at the first end of the encasement assembly, wherein a barrier anchor flange is coupled to the second environmental barrier flange at the second end of the encasement assembly, wherein the main anchor flange of the first flange sleeve assembly is affixed to the thermal expansion joint of the barrier expansion management assembly at the first end of the encasement assembly, and wherein the main anchor flange of the second flange sleeve assembly is affixed to the barrier anchor flange at the second end of the encasement assembly.

7. The encasement assembly of claim 5, wherein the encasement shell, barrier shell, main anchor flange, anchor sleeve, environmental barrier flange, thermal expansion joint, and expansion anchor flange are each formed from at least two arcuate components that assemble to form a circular enclosure.

8. The encasement assembly of claim 1, wherein the first axially extending internal port extends perpendicularly across a bottom end of the first radially extending external port.

9. The encasement assembly of claim 8, wherein the second axially extending internal port extends perpendicularly across a bottom end of the second radially extending external port.

10. The encasement assembly of claim 1, further comprising a galvanic cathodic protection element within the encasement shell.

11. The encasement assembly of claim 1, wherein the first radially extending external port and the first axially extending internal port are configured to provide access to the annulus between the encasement shell and the barrier shell, and wherein the second radially extending external port and the second axially extending internal port are configured to provide access to the annulus between the pipeline and the encasement shell, whereby each annulus is independently accessible for pressure testing and/or leak detection.

12. The encasement assembly of claim 1, wherein at least one of the first port and the second port is configured to be coupled to pressure monitoring equipment for real-time leak detection.

13. The encasement assembly of claim 1, wherein the first and second ports are configured to permit in-situ pressure testing while the pipeline remains in service.

14. An encasement assembly for a pipeline, the pipeline comprising at least one new or existing conduit, the encasement assembly comprising:

an encasement shell configured to enclose around the pipeline and provide a redundant pressure containment boundary surrounding the pipeline;

a barrier shell configured to enclose around the encasement shell and provide environmental protection for the encasement shell;

an environmental barrier flange sealably affixed to an end of the barrier shell to form an environmental barrier assembly with the barrier shell, the environmental barrier flange comprising at least two arcuate flange segments configured to be assembled around the barrier shell, each flange segment comprising a first connection portion configured for affixation to the barrier shell and a second connection portion extending radially outwardly from the first connection portion, the second connection portion including a plurality of fastener openings; and a barrier expansion management assembly configured to allow for differential thermal expansion between the encasement shell and the barrier shell, the barrier expansion management assembly comprising:

an expansion anchor flange comprising at least two arcuate flange segments configured to be assembled around the encasement shell, each flange segment comprising an axially extending portion and a radial connection portion extending outwardly therefrom, the radial connection portion including a plurality of fastener openings; and a thermal expansion joint sealably affixed to the axially extending portion of the expansion anchor flange, wherein the expansion anchor flange is sealably coupled to the environmental barrier flange by fasteners extending through corresponding fastener openings in the radial connection portion of the expansion anchor flange and the second connection portion of the environmental barrier flange, thereby affixing the barrier expansion management assembly to an end of the environmental barrier assembly.

15. The encasement assembly of claim 14, further comprising a first main anchor flange and a second main anchor flange, wherein the thermal expansion joint is directly and sealably affixed to the first main anchor flange at a first end of the environmental barrier assembly, and wherein a barrier anchor flange is coupled to the environmental barrier flange at a second end of the environmental barrier assembly opposite the first end, the barrier anchor flange being directly and sealably affixed to the second main anchor flange.

16. The encasement assembly of claim 15, wherein the environmental barrier assembly, the barrier expansion management assembly, the first main anchor flange, the second main anchor flange, and the barrier anchor flange cooperate to define a sealed chamber between an external surface of the encasement shell and an internal surface of the barrier shell.

17. The encasement assembly of claim 14, further comprising an anchor flange sleeve assembly configured to couple an end of the encasement shell.

18. The encasement assembly of claim 17, wherein the anchor flange sleeve assembly comprises an anchor sleeve coupled to a main anchor flange, the anchor sleeve being configured to affix directly to the pipeline.

19. The encasement assembly of claim 17, wherein the anchor flange sleeve assembly comprises a main anchor flange, the main anchor flange including:

a first radially extending external port providing an opening which extends radially inwardly from an exterior surface of the main anchor flange and a first axially extending internal port extending from the first radially extending external port and opening to an annulus between an external surface of the encasement shell and an internal surface of the barrier shell; and a second radially extending external port providing an opening which extends radially inwardly from the exterior surface of the main anchor flange and a second axially extending internal port extending from the second radially extending external port and opening to an annulus between an external surface of the pipeline and an internal surface of the encasement shell;

wherein the first radially extending external port and the first axially extending internal port are configured to permit pressure testing and/or leak detection of the annulus between the encasement shell and the barrier shell; and wherein the second radially extending external port and the second axially extending internal port are configured to permit pressure testing and/or leak detection of the annulus between the pipeline and the encasement shell and introduction of a protective fluid into the annulus between the pipeline and the encasement shell, wherein the protective fluid comprises a corrosion inhibitor.

* * * * *